United States Patent
Graham et al.

(10) Patent No.: US 7,346,765 B2
(45) Date of Patent: Mar. 18, 2008

(54) SYSTEMS AND METHODS FOR FACILITATING COMPUTER SYSTEM RECOVERY

(75) Inventors: Christoph J. Graham, Houston, TX (US); Tri M. Nguyen, Cypress, TX (US); Timothy S. Terry, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 499 days.

(21) Appl. No.: 10/880,779

(22) Filed: Jun. 30, 2004

(65) Prior Publication Data
US 2006/0005064 A1    Jan. 5, 2006

(51) Int. Cl.
*G06F 15/177* (2006.01)

(52) U.S. Cl. .......................................................... 713/2
(58) Field of Classification Search ..................... 713/2
See application file for complete search history.

(56) References Cited

U.S. PATENT DOCUMENTS

| 6,631,468 | B1 * | 10/2003 | von Below ..................... 713/2 |
| 6,907,523 | B2 * | 6/2005 | Patel .......................... 713/100 |
| 6,993,649 | B2 * | 1/2006 | Hensley ......................... 713/2 |

* cited by examiner

*Primary Examiner*—Rehana Perveen
*Assistant Examiner*—Eric Chang

(57) ABSTRACT

In one embodiment, a system and a method for facilitating computer system recovery includes identifying a desired delivery mechanism for performing a recovery, adapting a disk image for use with a particular type of recovery medium if a user communicated a desire to use that recovery medium, and writing the disk image to a target destination.

8 Claims, 7 Drawing Sheets

SYSTEMS AND METHODS FOR FACILITATING COMPUTER SYSTEM RECOVERY

BACKGROUND

When a computer system crashes, the system must be recovered before it can again be used. Such recovery is typically accomplished by reinstalling all the files and directories that comprise the "disk image" that was originally provided on the computer system. Before that can be done, however, the user must obtain a copy of the disk image to provide to the computer system.

Manufacturers often provide their customers with recovery solutions with which the customers can recover their computer systems. For instance, some manufacturers provide disk images that may be downloaded from the Internet and used with an appropriate delivery mechanism to recover a given computer system. The delivery mechanisms that may be used depend upon the nature of the computer system that is to be recovered. In some cases, a computing device can be recovered using a variety of delivery mechanisms. For example, a given computing device, such as terminal computer, may be recovered using any one of a bootable compact disc (CD), a bootable flash device, or a file-based process, such as a pre-boot execution environment (PXE) process.

Because each delivery mechanism is different, manufacturers have had no choice but to customize each recovery solution for the particular delivery mechanism that is to be used to perform the recovery. Therefore, if a situation exists in which more than one delivery mechanism is available for a given computer system, the manufacturer may choose to create a separate, specialized recovery solution for each delivery mechanism.

Development of multiple specialized recovery solutions wastes time and resources. Therefore, it would be desirable to have a single recovery solution that is adaptable so as to be available for use with multiple delivery mechanisms.

SUMMARY

In one embodiment, a system and a method for facilitating computer system recovery includes identifying a desired delivery mechanism for performing a recovery, adapting a disk image for use with a particular type of recovery medium if a user communicated a desire to use that recovery medium, and writing the disk image to a target destination.

BRIEF DESCRIPTION OF THE DRAWINGS

The systems and methods of this disclosure can be better understood with reference to the following drawings. The components in the drawings are not necessarily to scale.

DETAILED DESCRIPTION

Disclosed are systems and methods that facilitate computer system recovery. In particular, disclosed are systems and methods that aid a user in recovering a computer system, such as a computing device. As is described in greater detail in the following, a single recovery solution is provided that is adaptable so as to be deployable via various different disk image delivery mechanisms. By way of example, those delivery mechanisms include bootable compact discs (CDs), bootable flash devices, and file-based recovery processes.

Figure 1:
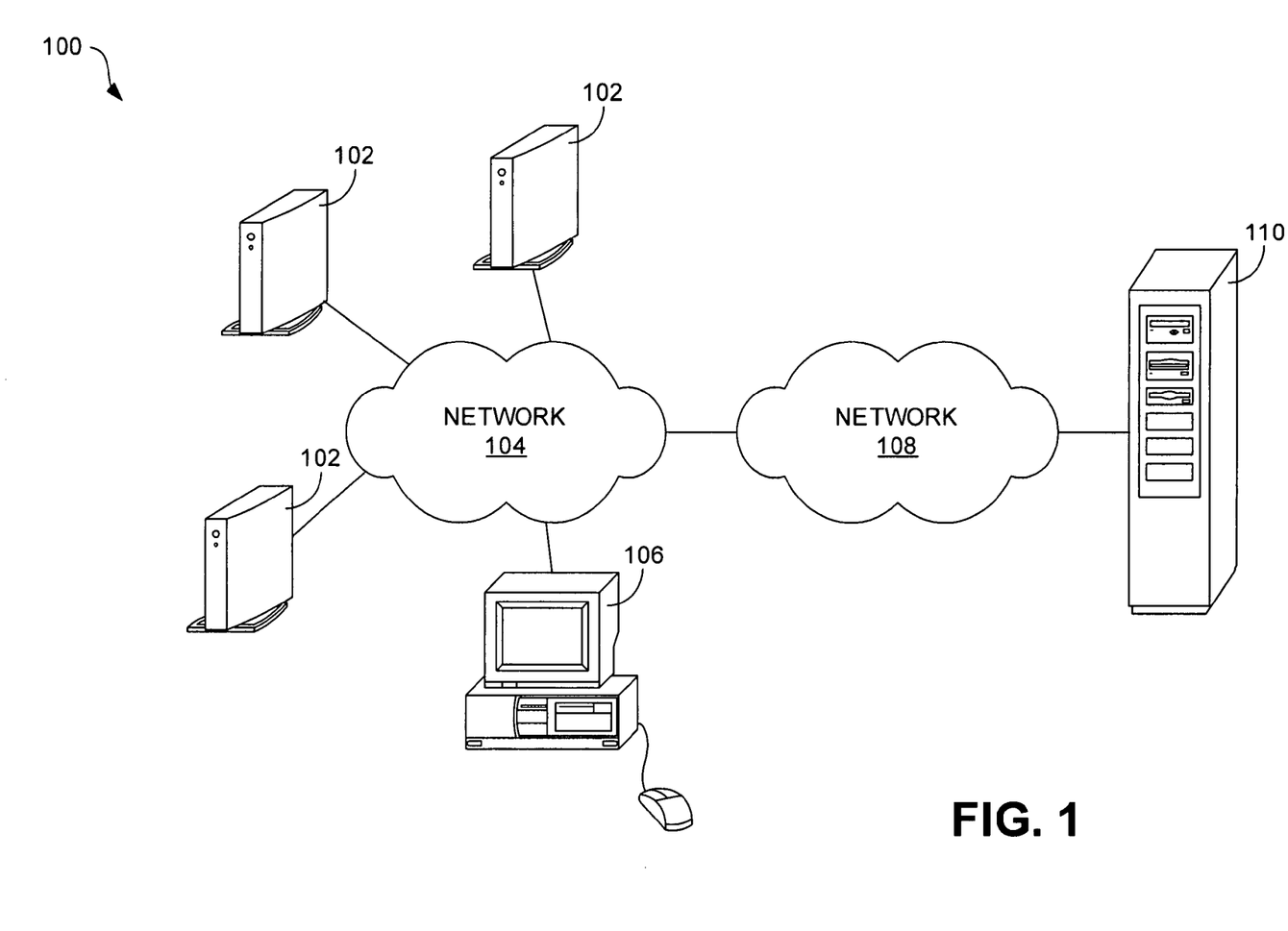
FIG. 1 is a schematic view of an embodiment of a system in which computer systems can be recovered using a recovery solution that is configured for use with multiple delivery mechanisms.

Referring now in more detail to the figures in which like numerals identify corresponding parts, FIG. 1 illustrates an example system 100. As is indicated in the figure, the system 100 generally comprises one or more computing systems or devices 102 for which a recovery solution is to be provided. By way of example, the computing devices 102 comprise terminal computers that include embedded operating systems stored in re-writable, solid-state (e.g., flash) memory. Although terminal computers have been specifically identified, the computing devices 102 could, alternatively, comprise other types of computers such as personal computers (PCs), workstations, notebook computers, or any other type of computer that comprises a disk image that may need to be recovered after a system crash.

Each of the computing devices 102 is connected to a first network 104 that, for example, comprises a local area network (LAN) of a customer who purchased the computing devices 102 from a given manufacturer. Optionally connected to the first network 104 is an administrator computer 106 that is, for instance, operated by a system administrator who is charged with the responsibility of managing all devices on the network and, therefore, performing device recovery as necessary. Therefore, the administrator computer 106 may be used in the recovery process by the system administrator to receive recovery images and configure them for installation on the computing devices 102. By way of example, the administrator computer 106 comprises a personal computer (PC).

Linked to the first network 104 is a second network 108. The second network 108 comprises, for example, a wide area network (WAN) that comprises part of the public Internet. Shown connected to the second network 108 is a server computer 110 that, for instance, is operated by or on the behalf of the manufacturer of the computing devices 102. As is described below, the server computer 110 may comprise recovery solutions (or "packages") that are available for download over the network 108. Therefore, the server computer 110, when provided, acts as a recovery resource for the system administrator (and, therefore, for the administrator computer 106).

Figure 2:
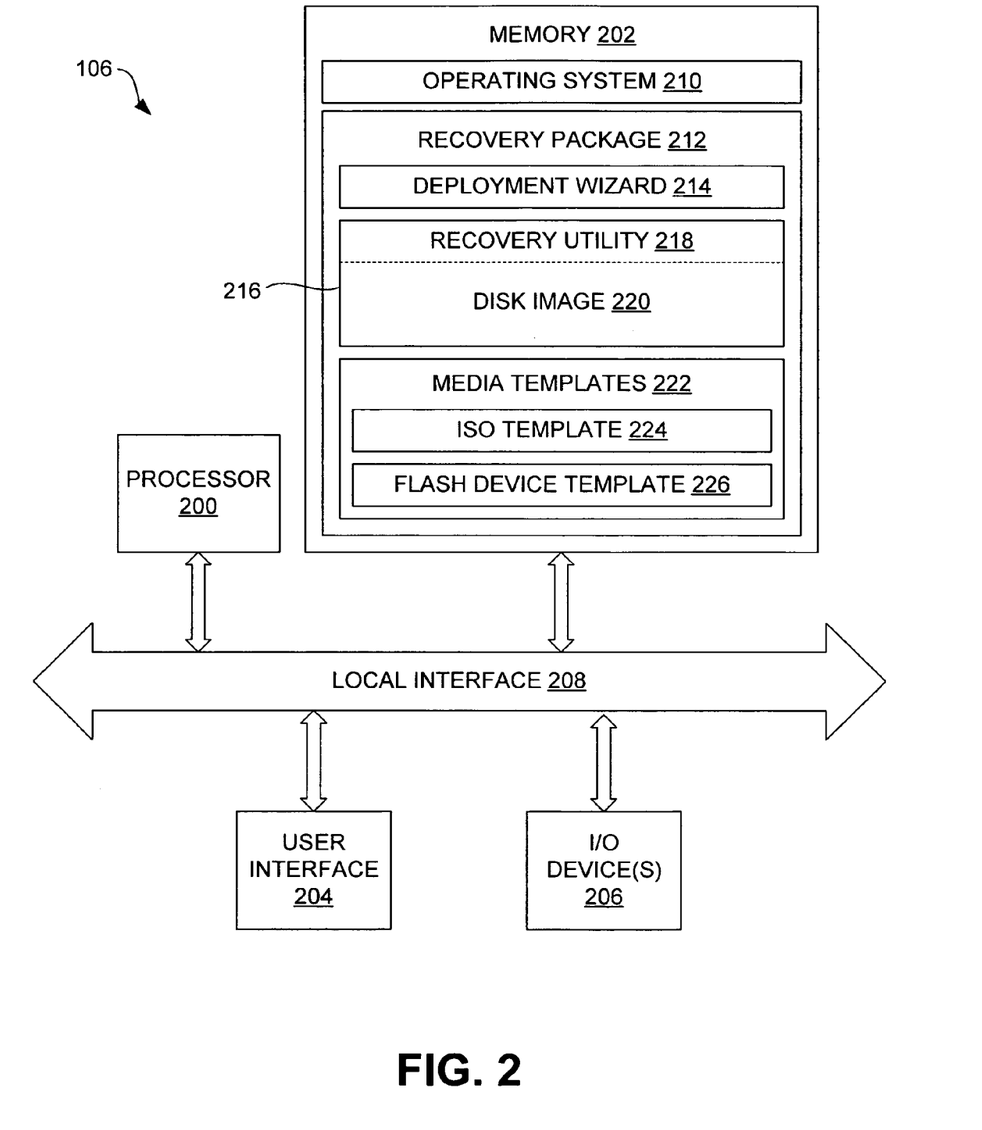
FIG. 2 is a block diagram of an embodiment of an administrator computer shown in FIG. 1.

FIG. 2 is a block diagram illustrating an example architecture for the administrator computer 106 shown in FIG. 1. As indicated in FIG. 2, the administrator computer 106 comprises a processor 200, memory 202, a user interface 204, and one or more input/output (I/O) devices 206, each of which is connected to a local interface 208.

The processor 200 can include any custom-made or commercially-available processor, a central processing unit (CPU), an auxiliary processor among several processors associated with the administrator computer 106, or a semiconductor-based microprocessor (in the form of a microchip). The memory 202 includes one or more volatile memory elements (e.g., read access memory (RAM)) and one or more nonvolatile memory elements (e.g., hard disk).

The user interface 204 comprises those components with which a user (e.g., system administrator) can directly interact with the administrator computer 106. Those components can comprise components that are typically used in conjunction with a PC, such as a keyboard, a mouse, and a display (e.g., monitor).

The one or more I/O devices 206 comprise the components used to facilitate connection of the administrator computer 106 to other devices and therefore, for instance, comprise one or more serial, parallel, small system interface (SCSI), or universal serial bus (USB), or IEEE 1394 connection elements. In addition, the I/O devices 206 comprise the components used to transmit and/or receive data over a network (e.g., network 106, FIG. 1) such as, for example, a network card or modem.

The memory 202 comprises various programs including an operating system (O/S) 210 and a recovery package 212. The O/S 210 controls the execution of other programs and provides scheduling, input-output control, file and data management, memory management, and communication control and related services.

The recovery package 212 comprises a collection of files and executable code that, for example, has been obtained from the manufacturer of the device for which recovery is to be performed. In such a case, the recovery package 212 may have been downloaded from a server (e.g., server computer 110) via the public Internet. As is shown in FIG. 2, the recovery package includes a deployment wizard 214, a disk image package 216, and media templates 222.

The deployment wizard 214 comprises a program that is used to obtain information from the user and, based upon that information initiate processes that aid the user in performing a system recovery (e.g., preparation of recovery media or delivery of files and recovery tools to be used in a file-based recovery process). As is described below, the deployment wizard 214 can be configured to run immediately upon being downloaded to a requesting computer (e.g., administrator computer 106), and can present a series of graphical user interfaces (GUIs) to the user with which various user selections can be entered.

The disk image package 216 comprises the files and code necessary to deploy a bootable recovery image on the target computing device (e.g., device 102). As is illustrated in FIG. 2, the disk image package 216 comprises both a recovery utility 218 and a disk image 220. The disk image 220 is a master file that comprises all of the files that together form the full disk image for the computing device. This image 220 can, for example, be generated using a disk image builder that is configured to access a plurality of individual files, and create a sector-based disk image from those files. A discussion of the operation of an example disk image builder is provided in U.S. patent application Ser. No. 10/872,259, filed Jun. 18, 2004, which is hereby incorporated in its entirety into the present disclosure. As is described in that patent application, disk images can be generated by creating file system structures within a target output file, incorporating file attribute data into the file system structures, and then reading each file from one or more selected directories block-by-block to append those blocks to the target output file.

The recovery utility 218 comprises the files and code that are required to write the disk image 220 to a selected destination (e.g., peripheral device or local directory) as a bootable disk image. The recovery utility 218 therefore extracts the disk image 220 and transfers it to the target destination. In cases in which the disk image 220 was created from independent files, as opposed to merely being copied from an existing disk image on a given storage medium geometry, the recovery utility 218 can write the disk image 220 to the target destination without knowledge of the disk image's file systems. In this process, customization is performed to ensure that the new image file matches the intended target device (e.g., USB device or ISO image file).

The media templates 222 comprise the data required to adapt the disk image 220 for a particular type of recovery medium. For example, as shown in FIG. 2, the media templates 222 can comprise an International Organization for Standardization (ISO) template 224 for creating an ISO image that can be transferred to a (e.g., CD-R) CD. Such a template 224 may include an El Torito boot image that contains the specifications associated with creating a bootable CD. In addition, the templates 222 can include a flash device template 226 for creating a bootable disk image on a flash device, such as a portable flash drive having a universal serial bus (USB) interface. Notably, although portable flash drives have been identified, other similar devices could be used that comprise a different type of storage media (e.g., of solid-state media). Therefore, flash devices, and the flash device template 226, are mentioned as examples only.

The particular nature of the templates 226 depends upon the target recovery medium. In the case of an ISO image, the template 224 is a header file containing the initial sectors (e.g., first 31 sectors) of a CD image. In the case of a USB, the template 226 comprises a set of instructions and structures necessary to recreate a bootable device. The instructions and structures are used to create a master boot record, and comprise the code to adapt the source image to the target device. Once a template is applied, in either case, the file system structures and files are appended to the target.

Various programs (i.e., logic) have been described above. It is to be understood that those programs can be stored on any computer-readable medium for use by or in connection with any computer-related system or method. In the context of this document, a computer-readable medium is an electronic, magnetic, optical, or other physical device or means that can contain or store a computer program for use by or in connection with a computer-related system or method. The programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

Example systems having been described above, examples of facilitating computer system recovery will now be discussed. In the discussions that follow, flow diagrams are provided. Any process steps or blocks in these flow diagrams may represent modules, segments, or portions of code that include one or more executable instructions for implementing specific logical functions or steps in the process. Although particular example process steps are described, alternative implementations are feasible. For instance, some steps may be executed out of order from that shown and discussed depending on the functionality involved.

Figure 3:
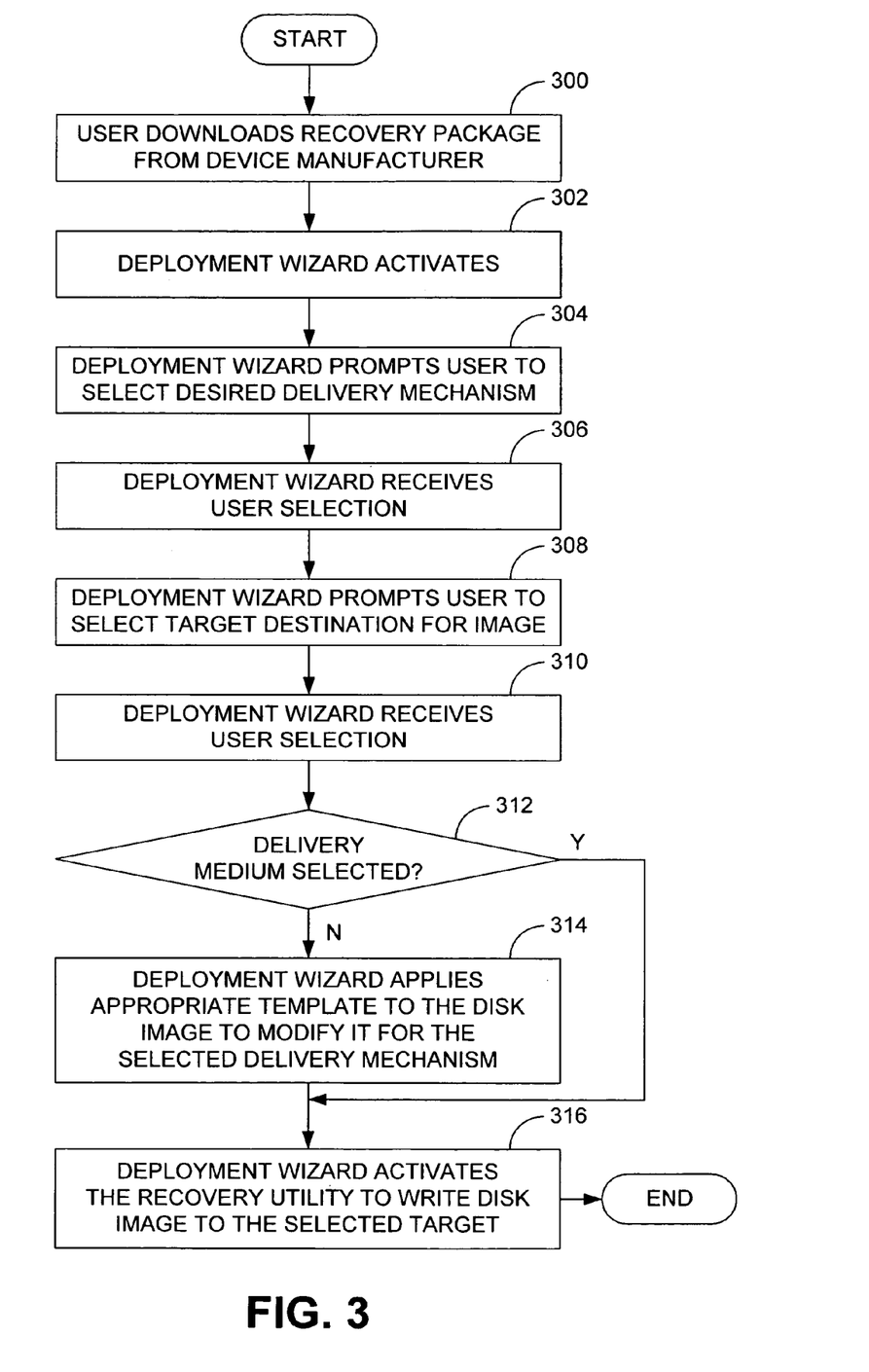
FIG. 3 is a flow diagram that illustrates an embodiment of a method for facilitating recovery of a computer system.

FIG. 3 provides an example of facilitating computer system recovery. More particularly, FIG. 3 provides an example of aiding a user in creating recovery media or preparing for a file-based recovery process. Beginning with block 300, the user first downloads a recovery package 212, for instance from the device manufacturer. An example configuration for the recovery package 212 has been described above in relation to FIG. 2.

Once the recovery package 212 is downloaded, the deployment wizard 214 activates, as indicated in block 302. That activation can be automatic, or can result in response to a user selection (e.g., selecting an .exe file or an icon). In either case, the deployment wizard 214 prompts the user to select a desired delivery mechanism that is to be used in the recovery process, as indicated in block 304. By way of example, several such delivery mechanisms can be provided for selection. Options include a specific recovery medium, such as a CD or a flash device, and a file-based recovery process.

Figure 4:
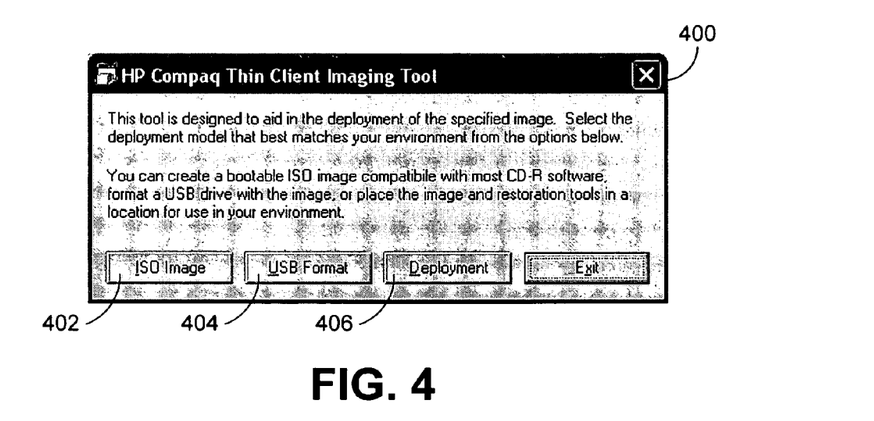
FIG. 4 illustrates an example delivery mechanism selection user interface.

FIG. 4 provides an example user interface 400 that may be presented to the user by the deployment wizard 214 to obtain the user's selection. As shown in that figure, the interface 400 includes buttons 402, 404, and 406 for selecting "ISO image," "USB format," and "Deployment," respectively. The "ISO image" button 402 can be selected when the user wishes to create an ISO image that can be transferred to a CD. The "USB format" button 404 can be selected when the user wishes to transfer the disk image on to a flash device having a USB interface. Finally, the "Deployment" button 406 can be selected when the user will use a file-based process, such as a pre-boot execution environment (PXE) process, to boot the disk image on computing device via a network connection.

Figure 5A:
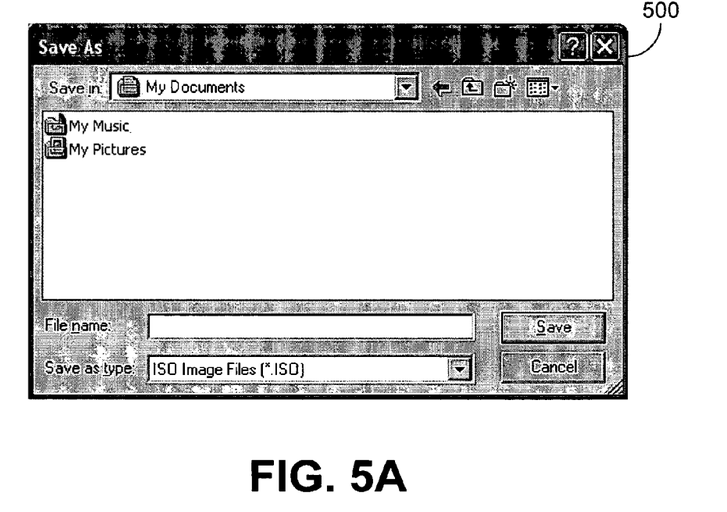
FIGS. 5A and 5B illustrate example user interfaces that pertain to a bootable compact disk recovery process.

Returning to FIG. 3, the deployment wizard 214 receives the user selection (e.g., entered by selection of one of the buttons of the user interface 400), as indicated in block 306. Once that selection is made, the deployment wizard 214 prompts the user to identify the target destination for the bootable disk image that is to be written, as indicated in block 308. If the user has selected to create a bootable CD, the user may, for example, identify a directory of the user computer (e.g., computer 106, FIG. 2) in which the disk image is to be written. This selection can be conveyed using a further user interface. FIG. 5A illustrates an example of such an interface. Specifically, FIG. 5A illustrates a user interface 500 that permits the user to identify the directory in which the image is to be "saved in."

Figure 6A:
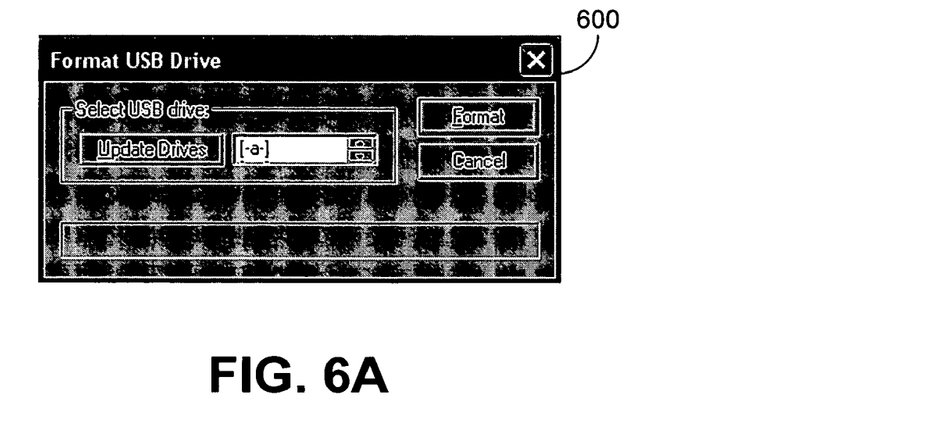
FIGS. 6A-6C illustrate example user interfaces that pertain to a bootable flash device recovery process.

If the user has selected to create a bootable flash device, the user may instead identify the device to the deployment wizard 214. FIG. 6A illustrates an example user interface 600 that can be used to make that identification. As is shown in FIG. 6A, the interface 600 can be used to identify a "USB drive." Once that drive has been selected, the user can select "Format" to initiate the writing process to that drive.

Figure 7A:
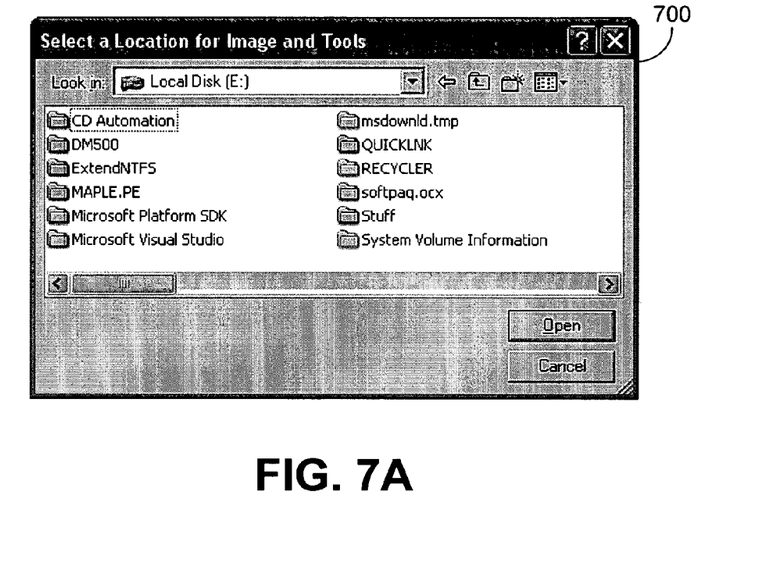
FIGS. 7A-7B illustrate example user interfaces that pertain to a file-based recovery process.

If the user opted for a file-based recovery solution, the user may identify a directory in which the image and the recovery utility or "tools" are to be stored. FIG. 7A illustrates an example user interface 700 that may be used to make that identification. As is shown in the figure, the user interface 700 permits the user to browse directories of his or her computer (e.g., computer 106, FIG. 2) for the purpose of identifying the target destination.

Returning to FIG. 3, the deployment wizard 214 receives the user selection, as indicated in block 310. Flow from this point depends in part upon whether a specific recovery medium has been selected by the user. Accordingly, with reference to decision block 312, the deployment wizard 214 identifies whether the user has selected to create a bootable CD or flash device, as opposed to simply opting to use a file-based recovery process. If the user has not selected a recovery medium, flow continues down to block 316 described below.

If, on the other hand, the user has selected a specific recovery medium, flow continues to block 314 at which the deployment wizard 214 applies the appropriate template to the disk image 220 to modify it for the selected recovery medium. As noted above, the template (e.g., template 224 or 226, FIG. 2) is used by the deployment wizard 214 to recreate a bootable device. An example of creating a bootable device for a solid-state device implementation is provided in U.S. patent application Ser. No. 10/794,213, filed Mar. 5, 2004, which is hereby incorporated by reference.

Figure 5B:
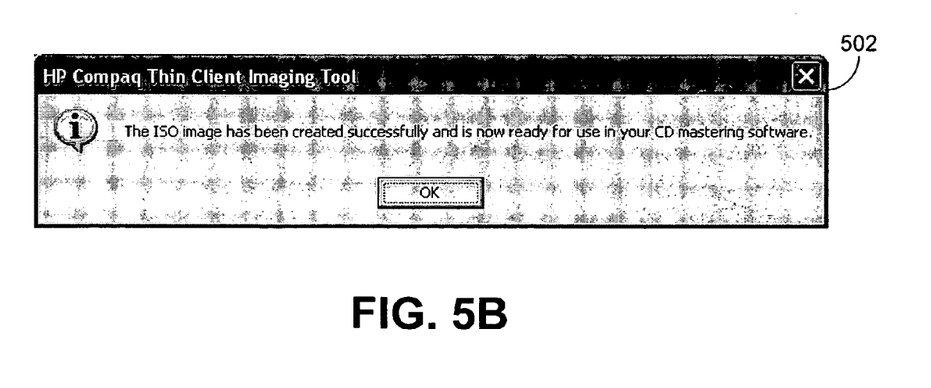
Figure 6B:
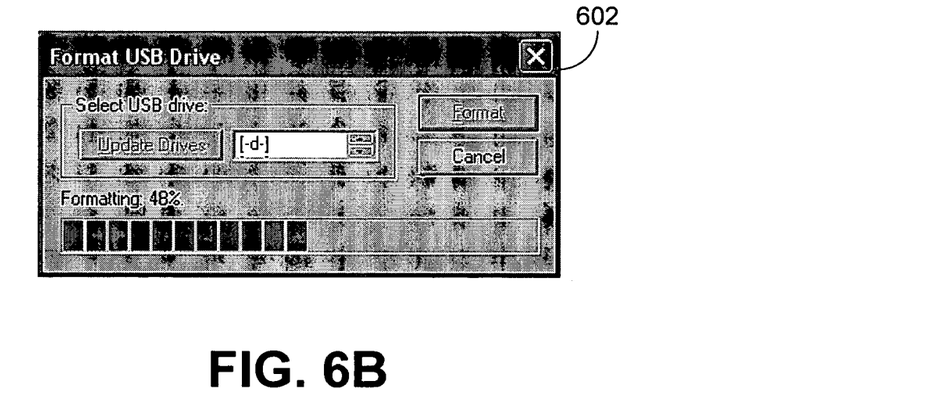
Figure 6C:
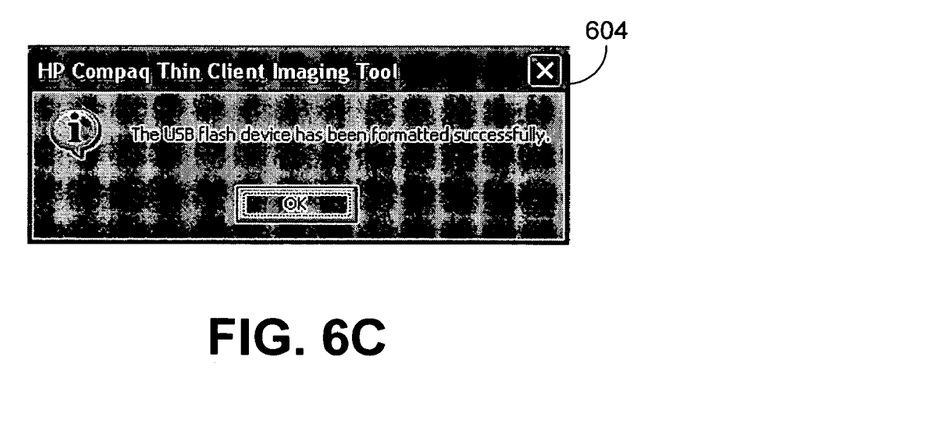
Figure 7B:
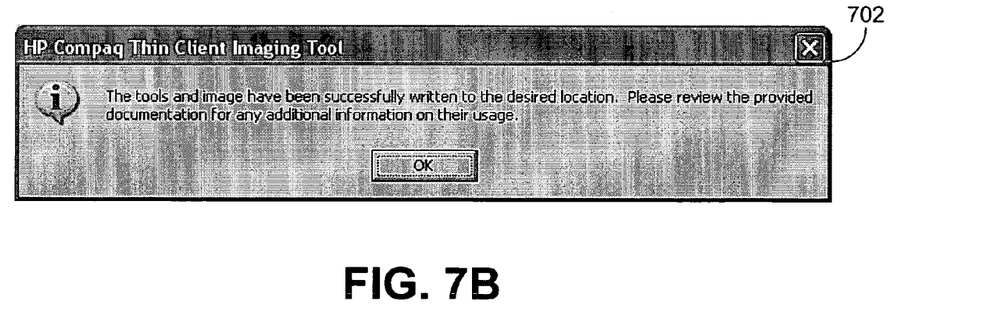

Once the template has been applied and the disk image 220 has been appropriately modified, or if no recovery medium was selected by the user (see block 312), flow continues to block 316 at which the deployment wizard 214 activates the recovery utility 218. Such activation is at the user's discretion. For example, the user may initiate the deployment wizard after the recovery utility 218 was integrated (e.g., through scripts or batch files) into the user's environment. The deployment wizard 214 causes the recovery utility 218 to write a disk image to the selected target destination. The progression and completion of the write process can be conveyed to the user with various user interfaces. For example, in the ISO image context, a user interface 502 shown in FIG. 5B can be presented to the user to convey successful creation of the ISO image and to prompt the user to transfer (i.e., burn) that image to form a bootable CD. In the flash device context, the user interface 602 of FIG. 6B can be used to indicate the progress of formatting the selected flash device (or other similar device), and the user interface 604 of FIG. 6C can be used to indicate successful completion of the formatting process and, therefore, creation of a bootable flash device. In similar manner, the interface 702 of FIG. 7B can be used to indicate successful transfer of the disk image and recovery utility ("tools") to the selected target destination.

Completion of the recovery process from this point is effected by the user. For instance, in the ISO image context, the user first transfers the ISO image to a CD, and then uses that CD (i.e., a bootable CD) to recover the computing device. In cases in which the computing device does not include an internal CD drive, an external drive (e.g., that connects to a USB port of the computing device) may be used to install the image on the computing device. In the flash device context, the computing device may be powered down, the flash device connected to the computing device (e.g., to a USB port of the computing device), and the computing device rebooted. In the file-based recovery process context, the user can manipulate the transferred disk image and recovery utility in the manner necessary to achieve recovery. For instance, the disk image and recovery utility can be used to recover the computing device by booting the device from a server on a network in a PXE process.

Figure 8:
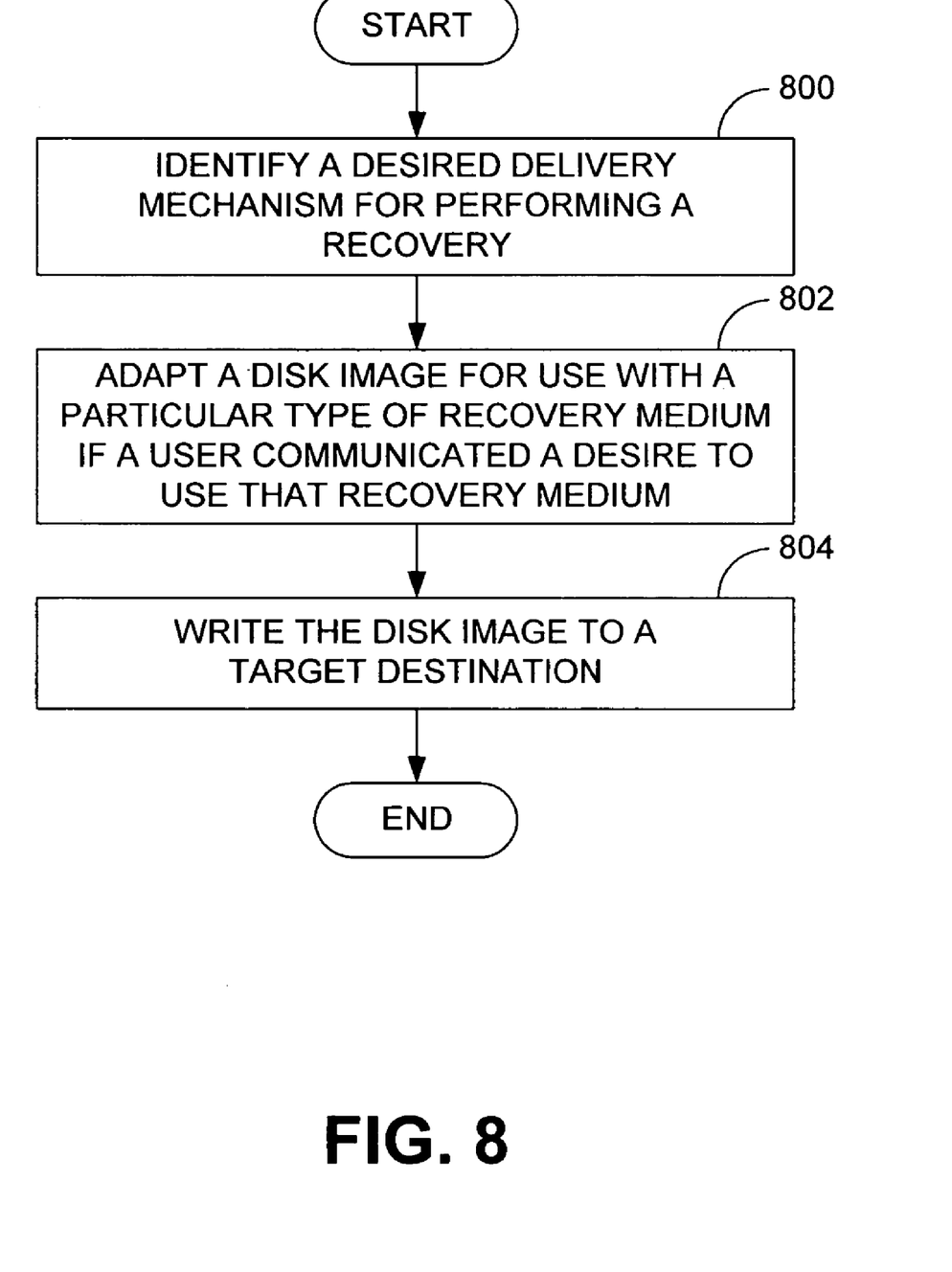
FIG. 8 is a flow diagram that illustrates a further method for facilitating recovery of a computer system.

FIG. 8 illustrates a further method for building a disk image including identifying a desired delivery mechanism for performing a recovery (block 800), adapting a disk image for use with a particular type of recovery medium if a user communicated a desire to use that recovery medium (block 802), and writing the disk image to a target destination (block 804).

What is claimed is:

1. A method for facilitating computer system recovery, the method comprising:

prompting a user to select one of a compact disc (CD) or a solid-state memory device as a type of recovery medium to be used to store a disk image for use in recovering the computer system;

receiving the user's recovery medium type selection;

automatically adapting the disk image for specific use with the type of recovery medium selected by the user; and writing the disk image to a target recovery medium.

2. The method of claim 1, wherein, when the selected recovery medium is a CD, adapting a disk image comprises applying an International Organization for Standardization (ISO) template to the disk image to create a file that is writable to a CD to form a bootable CD.

3. The method of claim 1, wherein, when the selected recovery medium is a solid-state memory device, adapting a disk image comprises applying a solid-state device template to the disk image to enable creation of a bootable solid-state device.

4. The method of claim 3, wherein applying a solid-state device template comprises applying a flash device template to enable creation of a bootable flash device.

5. A system for facilitating computer system recovery, the system comprising:

means for prompting a user to select one of a compact disc (CD) or a solid-state memory device as a recovery medium to be used to store a disk image for use in recovering the computer system;

means for receiving user selection of a desired recovery medium;

means for automatically adapting a disk image for specific use with the type of recovery medium selected by the user; and means for writing the disk image to a target recovery medium.

6. The system of claim 5, wherein the means for adapting comprise a template that is configured to modify the disk image for use on a compact disc (CD) and a template that is configured to modify the disk image for use on a solid-state device.

7. The system of claim 5, wherein the means for writing the disk image comprise means for writing to a selected computer directory.

8. The system of claim 7, further comprising means for writing a recovery utility to the selected computer directory.

* * * * *